Patented Apr. 23, 1946

2,399,084

UNITED STATES PATENT OFFICE 2,399,084

PRODUCTION OF SHAPED STRUCTURES FROM PROTEINS

Frederick K. Watson, Wilmington, Del., assignor to E. I. du Pont de Nemours & Company, Wilmington, Del., a corporation of Delaware No Drawing. Application October 27, 1943, Serial No. 507,887

11 Claims. (Cl. 260—8)

This invention relates to the production of shaped structures from proteins and more particularly to the production of fibers, filaments, films and coatings from compositions comprising proteins and water soluble salts of polymeric carboxylic acids.

In the preparation of aqueous protein solutions, it has been the usual practice to use basic agents such as sodium hydroxide, trisodium phosphate, sodium carbonate, and amines, as solubilization agents. Although such protein solutions have heretofore been formed into shaped structures, numerous difficulties have been encountered in practical operation. The first difficulty normally encountered is that the viscosity of such a protein solution is unstable even for short periods of time. Another difficulty is the inability to prepare consistently such protein solutions having similar viscosities, although the amounts of water, protein, and basic agent are very carefully measured. Still another difficulty has been that such shaped protein structures become stuck and even fused together where they touch each other or overlap during processing. A further difficulty has been that the shaped protein structures have low strengths and low resistance to dye baths, to mild alkaline solutions such as soap solutions, and to other media with which they normally come in contact. Thus protein shaped structures generally have been commercially unattractive.

This invention has as an object the conversion of compositions comprising proteins and water soluble salts of polymeric carboxylic acids into shaped structures, and more particularly into fibers, filaments, films, and coatings. It is a further object of this invention to accomplish the conversion of proteins into shaped structures under conditions favorable to the preservation of the protein molecular structure. Another object is to provide a process for the manufacture of shaped protein structures characterized by higher protein solution stability and a reduced tendency of the structures to stick together during processing. Still another object is to produce shaped protein structures having relatively greater strength and increased resistance to dye baths over those heretofore made. A further object is the production of protein shaped structures which are particularly susceptible to stretching. Other objects will appear hereinafter.

These objects are accomplished by the preparation of a homogeneous aqueous solution containing 6–40% by weight of a water-insoluble globular protein, from 1–25% by weight based on the protein of a water-soluble salt of a synthetic linear polymeric carboxylic acid, and a basic agent selected from the group consisting of ammonia, alkali metal hydroxides, and basic salts of alkali metals in amount sufficient to provide a pH of at least 9, and extruding this solution into a coagulating bath to form a shaped protein structure, and hardening the protein shaped structure by treatment with formaldehyde and a metallic salt having a tanning action.

The polymeric synthetic linear carboxylic acid is preferably a polymerization or interpolymerization product of an alpha, beta-ethylenically unsaturated carboxylic acid or anhydride which latter can be hydrolyzed to the carboxylic acid.

A preferred form of this invention consists in agitating for several minutes a finely divided water-insoluble globular protein, for example, commercial granulated sulfuric acid casein, and an aqueous solution of a water-soluble salt of a synthetic linear polymeric carboxylic acid. The basic agent is then added with continuous agitation to bring the pH of the solution to at least 9 and preferably to at least 10. The solution becomes homogeneous in about 2 hours or less at room temperature. Although agitation is not necessary to effect homogeneity of the solution, this state is attained more rapidly if agitation is employed.

In the preparation of fibers, the solution is then filtered and deaerated to avoid stoppages in the spinneret and fibers are then formed by a wet spinning process. The usual gear pump, candle filter and viscose type spinneret have been found satisfactory for use in the process of this invention.

From the spinneret the solution is extruded directly into a coagulating bath containing chemicals which facilitate the transformation of the solution from a liquid fiber into a solid fiber. A suitable bath is one containing both inorganic salts, such as sodium sulfate or sodium chloride and a strong mineral acid, the solution having a density greater than 1.1. The coagulating bath can be fitted with rollers mounted so that they can rotate on suitable shafts. Filaments issuing from the spinneret can be led around rollers before removal from the coagulating baths and may be subjected to stretching during travel between the various rollers. Alternatively, the coagulated fiber may be stretched in a bath containing an inorganic salt, for example, sodium chloride, preferably at elevated temperatures.

The coagulated fiber is then hardened in a suitable chemical solution. An appropriate hardening solution is one containing 7.6% sodium chloride, 3.9% aluminum sulfate, and 3.3% formaldehyde. The resulting fiber is rinsed, passed through a neutralizing bath if desired and is then dried. It may be used in continuous filament form or cut into staple.

Especially desirable results may be obtained by stretching the shaped structures, e. g., fibers, of this invention at some stage in their preparation. For example, fibers may be tensioned and stretched in the coagulating bath by means of appropriate yarn driven or motor driven pulleys and rollers. Generally higher degrees of stretch result in higher dry and wet tenacities in the final product. However, excessively high degrees of stretch in the coagulating bath cause frequent yarn and filament breakage. The preferred amount of stretch for a typical spinning solution and a coagulating bath temperature of about 60° C. lies between 100 and 1000%.

The fibers may also be stretched outside the coagulating bath in a separate bath. The stretching bath may comprise an inorganic salt or mixtures of various inorganic salts. Other substances such as organic or inorganic acids and plasticizers may be present. Generally the salt concentration in the stretching baths should be above 5% by weight and the temperature should be greater than 50° C. The preferred salt concentrations lie between 10 and 30% at temperatures between 70° and 110° C. The amount of stretch that may be applied in this secondary bath depends on the factors governing stretch in the coagulating bath, the temperature and composition of the secondary bath, and the amount of stretch which is applied in the coagulating bath itself. It has been found that continuous fibers are obtained from the solutions of the present invention which lend themselves particularly well to stretching.

This invention is further illustrated by the following examples in which the amounts are expressed in parts by weight unless otherwise specified and all the percentage quantities of the protein are based on its normal air dry weight. Measurements of all reagents are given in terms of their anhydrous rather than their hydrated weights.

*Example I*

A protein solution is made by agitating 250 parts of commercial granulated sulfuric acid casein with 523 parts of water and 50 parts of an aqueous solution containing 25% hydrolyzed, partially neutralized styrene/maleic anhydride (50:50) interpolymer having a pH of 5.5 and having roughly one-half of the carboxyl groups neutralized with sodium hydroxide. After several minutes 195 parts of 10% sodium hydroxide is added and agitation is continued. In one hour or less at room temperature the solution becomes homogeneous. It is then filtered at 20–60 lb. gauge pressure through an assembly of filter cloth and wire screens. The filtrate is centrifuged to aid in removing the air bubbles. The amount of centrifuging necessary varies with the amount of air introduced during filtration and the viscosity of the solution. For this composition one-half hour at 1500 R. P. M. has been found sufficient. Deaeration of the solution is completed by subjecting it to reduced pressure at about 0.5 lb./sq. in. absolute for one hour.

This composition is spun in ordinary viscose spinning apparatus. The solution is fed under 20 lb./sq. in. gauge pressure to a gear pump which forces the material at a regulatable rate through a candle filter and spinneret into the coagulating bath. The coagulating bath contains 14.3 parts of sodium sulfate, 3.3 parts of aluminum sulfate, 15 parts of sulfuric acid, and 67.4 parts of water, and is maintained at 60° C. In the coagulating bath the yarn is passed around four rollers or pulleys, two of which are mounted at each end of the coagulating bath in such a manner that they are free to rotate about vertical shafts. From the last roller the yarn is led directly to the windup bobbin. The windup speed is maintained at about 3400 in./min. and the jet velocity at about 860 in./min. Thus, during spinning the fibers are stretched about 300%. When the bobbin is full it is removed from the windup machine and rinsed rapidly in water to remove excess acid from the coagulating bath. The bobbins are then immersed for 24 hours in an aqueous hardening solution containing 76 parts sodium chloride, 39 parts aluminum sulfate, 33 parts formaldehyde, and 852 parts of water. The hardened fibers are washed with soft water and then may be finished in any desired manner such as impregnation with a 3% emulsion of a mixture of olive oil and sulfonated olive oil. The dry fibers are much easier to unwind than similar fibers prepared without a polymeric acid in the spinning solution since they are substantially free from sticking and matting.

*Example II*

A spinning solution prepared as in Example I is spun into the same coagulating bath as described in Example I but is withdrawn from the bath and wound up at a speed of about 900 in./min. such that practically no stretch occurs during coagulation. When the bobbin is full it is placed in a solution at pH 4.7 containing 210 parts of sodium sulfate, 11 parts of monosodium phosphate, 0.5 part of disodium phosphate, and 778 parts of water. After standing in this solution overnight the fibers are stretched 300% in a bath containing 10% sodium chloride and 10% aluminum sulfate at 82° C. The fibers are rinsed, hardened and finished as described in Example I. The fibers have tenacities of 1.2 g./d. dry and 0.6 g./d. wet, whereas present commercial casein fibers have tenacities of 0.8 g./d. dry and 0.3 g./d. wet. In addition, fibers prepared according to this example have higher elastic recovery from stretch than fibers prepared in the absence of the polymeric carboxylic acid.

*Example III*

A homogeneous spinning solution is prepared by stirring together 500 parts of sulfuric acid casein, 1840 parts of water, 63 parts of sodium hydroxide, and 32.5 parts of methacrolein/methacrylic acid (30:70) interpolymer, the sodium salt of the polymeric carboxylic acid being formed in situ. The solution is spun into a coagulating bath containing 19.4% sulfuric acid, 13.5% sodium sulfate, and 3.15% aluminum sulfate at a temperature of 57° C. The yarn is withdrawn directly from the coagulating bath and wound up on a bobbin at 2800 in./min., a speed several times greater than the jet velocity. When the bobbin is full it is removed from the winding machine and placed in a bath containing aluminum sulfate, sodium chloride and 10% formaldehyde. After standing overnight the insolubilized fibers are washed and dried. Fibers produced in this way have tenacities of 1.25 g./d. dry and 0.7 g./d. wet, whereas fibers spun by the same process but without a polymeric acid in the spinning solution have tenacities of 1.1 g./d. dry and 0.3 g./d. wet.

*Example IV*

A homogeneous solution containing 74 parts of water, 20 parts dry soybean protein, 2 parts sodium hydroxide and 4 parts of sodium polymethacrylate is prepared by stirring the ingredients together and is spun into a coagulating bath containing 220 parts of sodium sulfate, 40 parts of glucose, 40 parts of zinc sulfate, 20 parts of sulfuric acid and 680 parts of water. The fibers are withdrawn from the bath and hardened first, in a bath containing 24 parts of sodium chloride, 2 parts of formaldehyde, 1 part of sodium acetate and 73 parts of water and then in the hardening bath described in Example I. The hardened fibers after washing and drying are characterized by extreme openness and freedom from sticking together.

*Example V*

A homogeneous protein solution is prepared by mixing 250 parts of lactic casein with 700 parts of water, 100 parts of glycerin, and 45 parts of concentrated ammonium hydroxide containing 28% ammonia. To this solution are added with agitation 155 parts of 12% ammonium polymethacrylate solution and 135 parts of concentrated ammonium hydroxide containing 28% ammonia. Agitation is continued until the solution is homogeneous. Air bubbles are preferably removed by centrifugation. When deaeration is complete, a film is cast from the solution and dried. The film is then passed between tension rolls so that in the direction of rolling it is increased 100% in length. The elongated film is then further coagulated and insolubilized in a saturated potassium alum solution while kept in the extended state. It is then washed and dried. The resultant film is more resistant to blushing and swelling in water and has higher wet strength than films prepared similarly without ammonium polymethacrylate.

The synthetic linear polymeric carboxylic acids suitable for the practice of this invention are those formed by the polymerization of polymerizable alpha, beta-ethylenically unsaturated carboxylic acids, or interpolymers of these polymerizable acids with other polymerizable compositions, for example, polymerizable vinyl or vinylidene compounds. Included also are the polymeric carboxylic acids prepared by the hydrolysis of interpolymers of alpha, beta-ethylenically unsaturated carboxylic acid anhydrides, for example, maleic anhydride, and polymerizable vinyl and vinylidene compounds. The preferred polymeric carboxylic acids useful in this invention are the acids having at least one carboxyl group for every 15 carbon atoms and having a molecular weight greater than 1000.

Examples of various different kinds of polymeric carboxylic acids useful in this invention are:

1. Self-polymers of polymerizable aliphatic monocarboxylic acids having a methylene ($CH_2$) group attached by an ethylenic double bond to a carbon atom alpha to the carboxyl carbon of the carboxylic acid group. Examples of this group are the self-polymers of carboxylic acids of the acrylic series, such as polyacrylic acid, polymethacrylic acid, poly-alpha-methacrylic acid, poly-alpha-ethacrylic acid.

2. Interpolymers of monocarboxylic acids of the acrylic series with polymerizable vinyl or vinylidene compounds, for example, interpolymers of methacrylic acid with methyl methacrylate, methacrolein, vinyl acetate or styrene.

3. The hydrolyzed interpolymers of alpha, beta-ethylenically unsaturated dicarboxylic acid anhydrides, for example, maleic anhydride, with terminally unsaturated mono-olefins, such as ethylene, propylene, diisobutylene, isobutylene or methylene cyclohexane as disclosed in U. S. application Serial No. 410,337 filed September 10, 1941 (U. S. Patent No. 2,378,629).

4. The hydrolyzed interpolymers of alpha, beta-ethylenically unsaturated dicarboxylic acid anhydrides, for example, maleic anhydride with cyclic terpenes as dipentene which may be prepared by the process of United States Patent No. 2,118,925.

5. Hydrolyzed interpolymers of maleic anhydride, terpenes, and a polymerizable third component, as styrene or indene, which may be prepared by the process of U. S. application Serial No. 413,903 filed October 6, 1941 (now U. S. Patent No. 2,383,399).

6. Hydrolyzed interpolymers of alpha,beta-ethylenically unsaturated alpha,beta-dicarboxylic acid anhydrides, for example, maleic anhydride, with compounds capable of being polymerized and containing a single $>C=CH_2$ group, or more specifically vinyl or vinylidene compounds, for example, vinyl esters, as vinyl acetate; vinyl halides, as vinyl chloride, styrene; acrylic acid and its esters, as methyl acrylate; methacrylic acid and its esters, as methyl methacrylate, which may be prepared by the method described in United States Patent No. 2,047,398.

The presence of groups in the polymeric carboxylic acid in addition to carboxyl groups, such as halide, hydroxyl, ether, and ester groups is not objectionable. The presence of certain groups other than carboxyl groups in the polymeric carboxylic acid such as aldehyde groups may be even beneficial as they tend to supplement the final insolubilization step after formation of the shaped structure from the protein.

Methacrolein/methacrylic acid interpolymers and hydrolyzed styrene/maleic anhydride interpolymer are the preferred polymeric carboxylic acids since they are readily available and effect the greatest increase in fiber tenacity.

The water-soluble salts of the polymeric carboxylic acids are preferably the ammonium and the alkali metal salts of these acids, for example, the sodium and potassium salts.

The proteins suitable for use in this invention are the water-insoluble globular proteins of the class consisting of globulins, prolamines, and phosphoproteins. Casein is the preferred phosphoprotein because of its availability, standardized preparations, and susceptibility to the action of the agents and process of this invention. The globulins most suitable for the process of this invention are those derived from soybeans, cottonseed or peanuts. Zein is the best known and most suitable protein of the class of prolamines. In the preparation of films and fibers the viscosity of the spinning or casting solutions generally limits the solutions to those containing from 6–40% of protein. The preferred solutions contain between 15 and 30% protein by weight.

Any good commercial grade of globular protein is satisfactory. Proteins unavailable commercially may be satisfactorily prepared by a process similar to that disclosed in United States Patent No. 2,194,835 for the preparation of cottonseed protein. Methods of preparation which involve subjecting the protein materials to high temperatures at any stage in their preparation should be avoided since this causes undesirable changes in the protein.

Mixtures of water-insoluble globular proteins and of water-soluble salts of synthetic polymeric carboxylic acids may also be employed as well as individual components.

The basic agents used in the preparation of the solutions of this invention may be inorganic bases including caustic alkalies, basic salts of alkali metals and ammonia or organic bases such as amines and quaternary ammonium hydroxides. The preferred basic agents are sodium hydroxide, potassium hydroxide and ammonium hydroxide.

The solution may contain other materials in addition to the basic agent, protein and polymeric carboxylic acid salt. Examples of these are plasticizers, such as ethanolformamide, pigments, bactericides and anti-foam agents.

The use of the water-soluble polymeric carboxylic acid salts in the basic protein spinning solutions results in fibers having higher tenacities and reduced freedom from sticking and clinging together as compared with fibers spun without the addition of such agents. The use of less than 1% of the polymeric carboxylic acid salts based on the protein produces substantially no effect on the tenacity or sticking. The use of more than 25% of the polymeric carboxylic acid salts produces improved freedom from sticking but at the same time results in decreased fiber tenacities.

In explanation of the advantageous properties conferred on the protein fibers spun from a spinning solution containing a protein and a water-soluble salt of the polymeric carboxylic acids it is believed that the salt of the polymeric carboxylic acid acts as a "latent hardening agent" for the protein. Upon contacting the mixture of the protein and the polymeric carboxylic acid salt with an acidic agent as, for example, in a coagulating bath, the salt of the carboxylic acid is converted to the polymeric acid itself. The protein and the polymeric acid then react with the result that the protein is "hardened" and is in a condition which is particularly suitable for stretching. This probably accounts for the completely unsuspected and surprising results that the fibers spun from protein solutions containing the salts of the polymeric carboxylic acids are stronger and freer from stuck and broken filaments than fibers spun from solutions which do not contain the added acidic agent. Fibers which are spun from the usual alkali solubilizing bath without the added agent become swollen in the coagulating bath before they are hardened which leads to the sticking together of the fibers.

A further surprising result is that the mixture of the protein and the water-soluble salt of the polymeric carboxylic acid has normally a lower viscosity than the solution of the globular protein in the usual aqueous alkali solutions which do not contain the added agent. Furthermore, the viscosity of these solutions does not show as great change with time and the present spinning solutions are actually more stable than the normal spinning solutions formed without the agent. This is of great importance in exerting proper control over spinning. In fact, it appears that the salt of the polymeric carboxylic acid possesses the power of solubilizing the globular protein. It has been found that if the water-soluble salt of the polymeric carboxylic acid is mixed with the water-insoluble globular protein in substantially equivalent amounts, the protein can actually be solubilized in a substantially neutral medium; that is, in the absence of alkali.

It is desirable and probably essential that the coagulating bath and/or the hardening bath contain a polyvalent metal salt such as aluminum sulfate, zinc sulfate, lead acetate, zinc chloride, etc., which will react with the polymeric carboxylic acid or soluble salt thereof to effect still further insolubilization, thus increasing the water resistance and strength of the fibers.

An alternative procedure for formation of fibers involves spinning into a gaseous atmosphere which may be heated to hasten removal of water from the filaments and may contain volatile acids to neutralize the basic components of the spinning solution. Insolubilizing agents, such as formaldehyde, may also be present in the atmosphere.

The solutions of this invention may be further employed as coating compositions for fabrics and other base materials. For this application volatile basic agents such as ammonia and certain amines, for example, short chain alkyl amines, are preferred for preparing the protein solution.

In the preparation of films by the process of this invention the protein solution may be dry cast onto a wheel or a moving belt, partially dried, removed from the casting surface and insolubilized in one or more steps prior to drying. Appropriate insolubilizing solutions are those described herein for application to filaments. It is especially desirable to elongate or stretch the film up to several hundred per cent before or after partial insolubilization but prior to complete and final hardening.

Another procedure involves extrusion of the protein solution through appropriate slotted orifices directly into an aqueous bath of the type used for coagulating fibers. Further steps in this alternative method are similar to those used in the dry casting procedure.

The products of this invention are useful as textile fibers, wrapping films and coating compositions. The fibers may be used alone or blended with rayon, cellulose acetate, wool, or cotton materials to produce a more attractive product from the standpoint of either cost or physical attractiveness. The films are mainly useful for wrapping and packaging purposes. With respect to a given base material the coating compositions may fulfill a variety of functions such as producing gloss, decreasing porosity, protecting against degradative agents, as a pigmentation vehicle and for the simulation of leather.

As many apparently widely different embodiments of this invention may be made without departing from the spirit and scope thereof, it is to be understood that I do not limit myself to the specific embodiments thereof except as defined in the appended claims.

I claim:

1. A spinning solution which comprises a homogeneous aqueous solution containing 6–40% by weight of a water-insoluble protein of the class consisting of globulins, prolamines and phosphoproteins, from 1–25% by weight based on the protein of a water-soluble salt of a synthetic linear polymeric carboxylic acid, and a basic agent selected from the group consisting of ammonia, alkali metal hydroxides, and basic salts of alkali metals in amount sufficient to provide a pH of at least 9.

2. The spinning solution set forth in claim 1 in which the synthetic linear polymeric carboxylic acid is a polymerization product of an alpha, beta-ethylenically unsaturated carboxylic acid.

3. The spinning solution set forth in claim 1 in which the synthetic linear polymeric carboxylic acid is a hydrolyzed interpolymer of maleic anhydride and a vinylidene compound.

4. The spinning solution set forth in claim 1 in which the synthetic linear polymeric carboxylic acid is polymethacrylic acid.

5. The spinning solution set forth in claim 1 in which the synthetic linear polymeric carboxylic acid is a hydrolyzed styrene/maleic anhydride interpolymer.

6. The spinning solution set forth in claim 1 in which the protein is casein.

7. The spinning solution set forth in claim 1 in which the protein is casein and the synthetic linear polymeric carboxylic acid is a polymethacrylic acid.

8. The spinning solution set forth in claim 1 in which the protein is casein and the synthetic linear polymeric carboxylic acid is a hydrolyzed styrene/maleic anhydride interpolymer.

9. The spinning solution set forth in claim 1 in which the protein is casein and the synthetic linear polymeric carboxylic acid is a methacrolein/methacrylic acid interpolymer.

10. A spinning solution which comprises a homogeneous aqueous solution containing from 6% to 40% by weight of casein, from 1% to 25% by weight based on the casein of a water-soluble salt of a hydrolyzed styrene/maleic anhydride interpolymer, and sodium hydroxide in amount sufficient to provide a pH of at least 9.

11. A spinning solution as set forth in claim 1 in which the synthetic linear polymeric carboxylic acid is a hydrolyzed interpolymer of maleic anhydride with a vinyl compound.

FREDERICK K. WATSON.